(12) United States Patent
Raguse et al.

(10) Patent No.: US 11,100,579 B1
(45) Date of Patent: Aug. 24, 2021

(54) COMMODITY TRACKING SYSTEM AND METHOD

(71) Applicant: Myriad Mobile, Inc., Fargo, ND (US)

(72) Inventors: Ryan Raguse, Fargo, ND (US); Jake Joraanstad, Fargo, ND (US); Dane Braun, Fargo, ND (US)

(73) Assignee: Bushel, Inc., Fargo, ND (US)

( * ) Notice: Subject to any disclaimer, the term of this patent is extended or adjusted under 35 U.S.C. 154(b) by 36 days.

(21) Appl. No.: 16/100,129

(22) Filed: Aug. 9, 2018

Related U.S. Application Data (60) Provisional application No. 62/543,200, filed on Aug. 9, 2017.

(51) Int. Cl.
| | |
|---|---|
| *G06Q 40/04* | (2012.01) |
| *G06Q 40/06* | (2012.01) |
| *G06Q 50/02* | (2012.01) |
| *G06Q 30/02* | (2012.01) |
| *G06Q 10/08* | (2012.01) |

(52) U.S. Cl.
CPC .............. *G06Q 40/04* (2013.01); *G06Q 10/08* (2013.01); *G06Q 30/0201* (2013.01); *G06Q 30/0206* (2013.01); *G06Q 40/06* (2013.01); *G06Q 50/02* (2013.01)

(58) Field of Classification Search
None
See application file for complete search history.

(56) References Cited

U.S. PATENT DOCUMENTS

| | | | | |
|---|---|---|---|---|
| 6,327,569 | B1* | 12/2001 | Reep | A01D 41/127 705/37 |
| 2002/0069156 | A1* | 6/2002 | Adam | G06Q 30/06 705/37 |
| 2006/0004907 | A1 | 1/2006 | Pape et al. | |
| 2011/0190009 | A1* | 8/2011 | Gerber, Jr. | H04W 12/02 455/456.3 |
| 2013/0024330 | A1* | 1/2013 | Christie | G01S 5/0027 705/28 |
| 2016/0132938 | A1* | 5/2016 | Wiener | G06Q 30/0269 705/14.66 |
| 2016/0134599 | A1* | 5/2016 | Ross | H04L 63/08 713/168 |
| 2016/0267432 | A1* | 9/2016 | Hodges | G06Q 10/0833 |

OTHER PUBLICATIONS

N. M. A. Basim et al., "Autobot for precision farming," 2017 International Conference on Innovations in Electrical, Electronics, Instrumentation and Media Technology (ICEEIMT), 2017, pp. 1-6, doi: 10.1109/ICEEIMT.2017.8116804. (Year: 2017).*

* cited by examiner

*Primary Examiner* — Gregory S Cunningham, II
(74) *Attorney, Agent, or Firm* — Danielson Legal LLC (57) ABSTRACT

Methods and systems for tracking a commodity. The systems and methods may receive commodity data and data regarding a market condition. The systems and methods may assign a financial value to an entity's commodity and communicate an alert to the entity upon the assigned financial value satisfying a predetermined condition.

19 Claims, 6 Drawing Sheets

COMMODITY TRACKING SYSTEM AND METHOD

CROSS-REFERENCE TO RELATED APPLICATIONS

The present application claims benefit of U.S. provisional application No. 62/543,200, filed on Aug. 9, 2017, the entire disclosure of which is incorporated by reference as if set forth in its entirety herein.

TECHNICAL FIELD

Embodiments described herein generally relate to systems and methods for tracking a commodity.

BACKGROUND

Existing agriculture supply chains generally disconnect growers at the start of the first segment of distribution. For example, growers may only be involved in the supply chain until a commodity reaches an elevator or co-op.

While existing enterprise resource planning (ERP) systems help distributors focus on internal logistics and financials, they do not focus on establishing automated supply chain connections between involved parties. For example, existing ERPs do not establish connections to growers or their suppliers with referential integrity between the parties' various ERP systems. Ultimately, certain data about the commodity that is stored at the grower's bin or other associated storage facility is not collected when the grain is in storage. This makes tracking the commodity difficult.

A need exists, therefore, for methods and systems for tracking a commodity that overcome the disadvantages of existing enterprise resource planning systems.

SUMMARY

This summary is provided to introduce a selection of concepts in a simplified form that are further described below in the Detailed Description section. This summary is not intended to identify or exclude key features or essential features of the claimed subject matter, nor is it intended to be used as an aid in determining the scope of the claimed subject matter.

According to one aspect, embodiments relate to a method for tracking a commodity. The method includes receiving commodity data using a translator service from at least one enterprise resource planning system, wherein the commodity data includes at least one of a quantity of an entity's commodity, a location of the commodity, at least one characteristic of the commodity, movement of the commodity, and a transaction involving the commodity; receiving data regarding a market condition relating to the commodity using the translator service; assigning, using a processor executing instructions stored on a memory, a financial value to the commodity based on the data regarding the market condition and the commodity data; and communicating an alert using an interface to the entity upon the assigned financial value satisfying a predetermined condition.

In some embodiments, the predetermined condition includes at least one of price, volume, and discount criteria.

In some embodiments, the method further includes receiving, using the translator service, delivery data associated with delivery of the commodity at a delivery location. In some embodiments, the delivery location is a customer location or an elevator.

In some embodiments, the data regarding the location of the commodity or the movement of the commodity is received from a beacon device configured with at least one commodity transportation vehicle.

In some embodiments, the method further includes communicating the commodity data from the translator service to a cloud service platform. In some embodiments, the platform is accessible by an application API to permit retrieval of standardized data from the platform.

In some embodiments, the commodity is grain.

In some embodiments, the at least one characteristic of the commodity includes at least one of protein content and moisture content.

In some embodiments, the method further includes authenticating the entity by receiving a phone number from the entity, verifying the received phone number is associated with a registered entity, providing a code to the received phone number, and receiving the provided code from the received phone number.

According to another aspect, embodiments relate to a system for tracking a commodity. The system includes a translator service for receiving commodity data and data regarding a market condition relating to the commodity, wherein the commodity data includes at least one of a quantity of an entity's commodity, a location of the commodity, at least one characteristic of the commodity, movement of the commodity, and a transaction involving the commodity, and a processor executing instructions stored on a memory for: assigning a financial value to the commodity based on the data regarding the market condition and the commodity data, and communicating an alert using an interface to the entity upon the assigned value satisfying a predetermined condition.

In some embodiments, the predetermined condition includes at least one of price, volume, and discount criteria.

In some embodiments, wherein the translator service is further configured to receive delivery data associated with delivery of the commodity at a delivery location. In some embodiments, the delivery location is a customer location or an elevator.

In some embodiments, the data regarding the location of the commodity or the movement of the commodity is received from a beacon device configured with at least one commodity transportation vehicle.

In some embodiments, the system further includes a cloud service platform configured to receive the commodity data from the translator service. In some embodiments, the platform is accessible by an application API to permit retrieval of standardized data from the platform.

In some embodiments, the commodity is grain.

In some embodiments, the at least one characteristic of the commodity includes at least one of protein content and moisture content.

According to yet another aspect, embodiments relate to a non-transitory computer readable medium containing computer-executable instructions for performing a method for tracking a commodity. The medium includes computer-executable instructions for receiving commodity data using a translator service from at least one enterprise resource planning system, wherein the commodity data includes at least one of a quantity of an entity's commodity, a location of the commodity, at least one characteristic of the commodity, movement of the commodity, and a transaction involving the commodity; computer-executable instructions for receiving data regarding a market condition relating to the commodity using the translator service; computer-executable instructions for assigning, using a processor executing instructions stored on a memory, a financial value to the commodity based on the data regarding the market condition and the commodity data; and computer-executable instructions for communicating an alert using an interface to the entity upon the assigned financial value satisfying a predetermined condition.

BRIEF DESCRIPTION OF DRAWINGS

Non-limiting and non-exhaustive embodiments of the embodiments herein are described with reference to the following figures, wherein like reference numerals refer to like parts throughout the various views unless otherwise specified.

DETAILED DESCRIPTION

Various embodiments are described more fully below with reference to the accompanying drawings, which form a part hereof, and which show specific exemplary embodiments. However, the concepts of the present disclosure may be implemented in many different forms and should not be construed as limited to the embodiments set forth herein; rather, these embodiments are provided as part of a thorough and complete disclosure, to fully convey the scope of the concepts, techniques and implementations of the present disclosure to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment. The appearances of the phrase "in some embodiments" in various places in the specification are not necessarily all referring to the same embodiments.

Some portions of the description that follow are presented in terms of symbolic representations of operations on non-transient signals stored within a computer memory. These descriptions and representations are used by those skilled in the data processing arts to most effectively convey the substance of their work to others skilled in the art. Such operations typically require physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices. Portions of the present disclosure include processes and instructions that may be embodied in software, firmware or hardware, and when embodied in software, may be downloaded to reside on and be operated from different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each may be coupled to a computer system bus. Furthermore, the computers referred to in the specification may include a single processor or may be architectures employing multiple processor designs for increased computing capability.

The processes and displays presented herein are not inherently related to any particular computer or other apparatus. Various general-purpose systems may also be used with programs in accordance with the teachings herein, or it may prove convenient to construct more specialized apparatus to perform one or more method steps. The structure for a variety of these systems is discussed in the description below. In addition, any particular programming language that is sufficient for achieving the techniques and implementations of the present disclosure may be used. A variety of programming languages may be used to implement the present disclosure as discussed herein.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

Embodiments described herein provide novel commodity tracking services that connect existing ERPs to a scalable cloud platform. The existing ERPs may be connected to a cloud-based network where data associated with the ERPs is automatically made available to growers and their suppliers.

Growers, farmers, or other types of entities (for simplicity, "growers") may access the cloud platform to receive data regarding their commodities from a variety of different sources. Growers may, for example, track the quantity of their commodities, the location of their commodities (e.g., during transport), the status of any commodity orders, whether a commodity delivery has been fulfilled, market conditions related to the commodity, or the like. The above list is exemplary and it is contemplated that growers may receive other types of data for managing their commodities and/or their business. Although the present application largely describes grain or corn as the commodity of interest, it is contemplated that the features of the present application may be used in conjunction with any other type of commodity.

By receiving this commodity-related data, growers may obtain a real time view of their financial position(s) with respect to their commodities. Similarly, growers may enter alert criteria via a user device so that the systems and methods described herein may alert them when one or more predetermined conditions with respect to their commodities are satisfied. For example, a grower may configure their user device to alert them by email, SMS, instant messaging, or the like when various conditions such as price, volume, bids, or the like, are satisfied.

Figure 1:
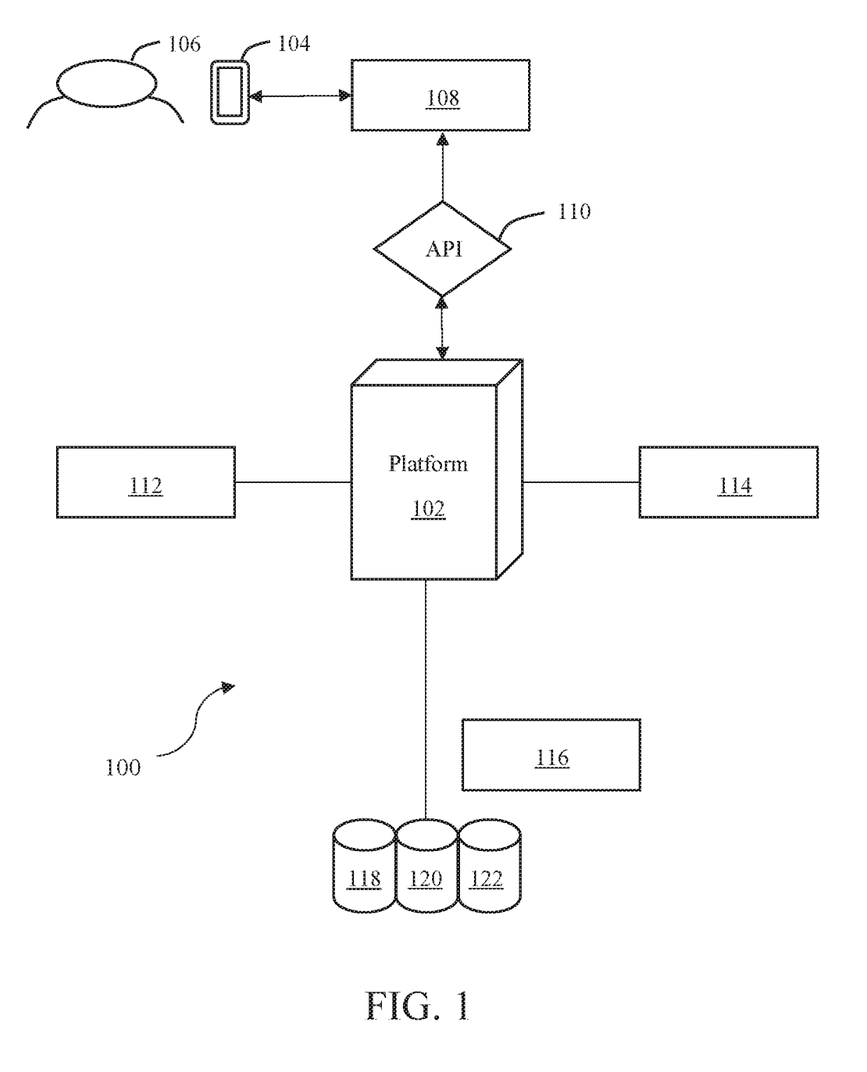
FIG. 1 illustrates a system for tracking a commodity in accordance with one embodiment.

FIG. 1 illustrates a system 100 for tracking a commodity in accordance with one embodiment. The system 100 may include a platform 102, a user device 104 accessible by a grower 106 (or some other type of entity), a translator node 108, an application programming interface (API) 110, a commodity market node 112, a delivery node 114, a content management system (CMS) 116, and one or more databases 118, 120, and 122.

The platform 102 may enable the tracking of a grower's activities and commodities across ERP systems in real time. The platform 102 may be accessible by a variety of other systems or nodes 108, 110, 112, and 114 to receive and communicate various types of data.

The platform 102 may receive or otherwise store data related to, for example, scale tickets, contracts, customers, fields, notifications, beacons, invoices, weather, and entity credentials. The above list is exemplary and the platform 102 may store various other types of data to accomplish the features of the systems and methods described herein.

The user device 104 may be any suitable device executing an appropriate user interface to allow the grower 106 to interact with the platform 102. The user device 104 may be configured as a smartphone, tablet, PC, laptop, smartwatch, or the like. The user interface executing on the user device 104 may be presented as any suitable application such as a web portal to allow the grower 106 to input parameters regarding alert conditions and to view various types of data regarding their commodities.

The user device 104 may be configured with any appropriate processor or processing device executing instructions stored on a memory to accomplish the features of various embodiments described herein. The processor may be any hardware device capable of executing instructions stored on the memory or storage or otherwise capable of processing data. As such, the processor may include a microprocessor, field programmable gate array (FPGA), application-specific integrated circuit (ASIC), or other similar devices.

The memory may include various memories such as, for example L1, L2, or L3 cache or system memory. As such, the memory may include static random access memory (SRAM), dynamic RAM (DRAM), flash memory, read only memory (ROM), or other similar memory devices. The exact configuration of the memory may vary as long as instructions for tracking a commodity can be executed.

Figure 2:
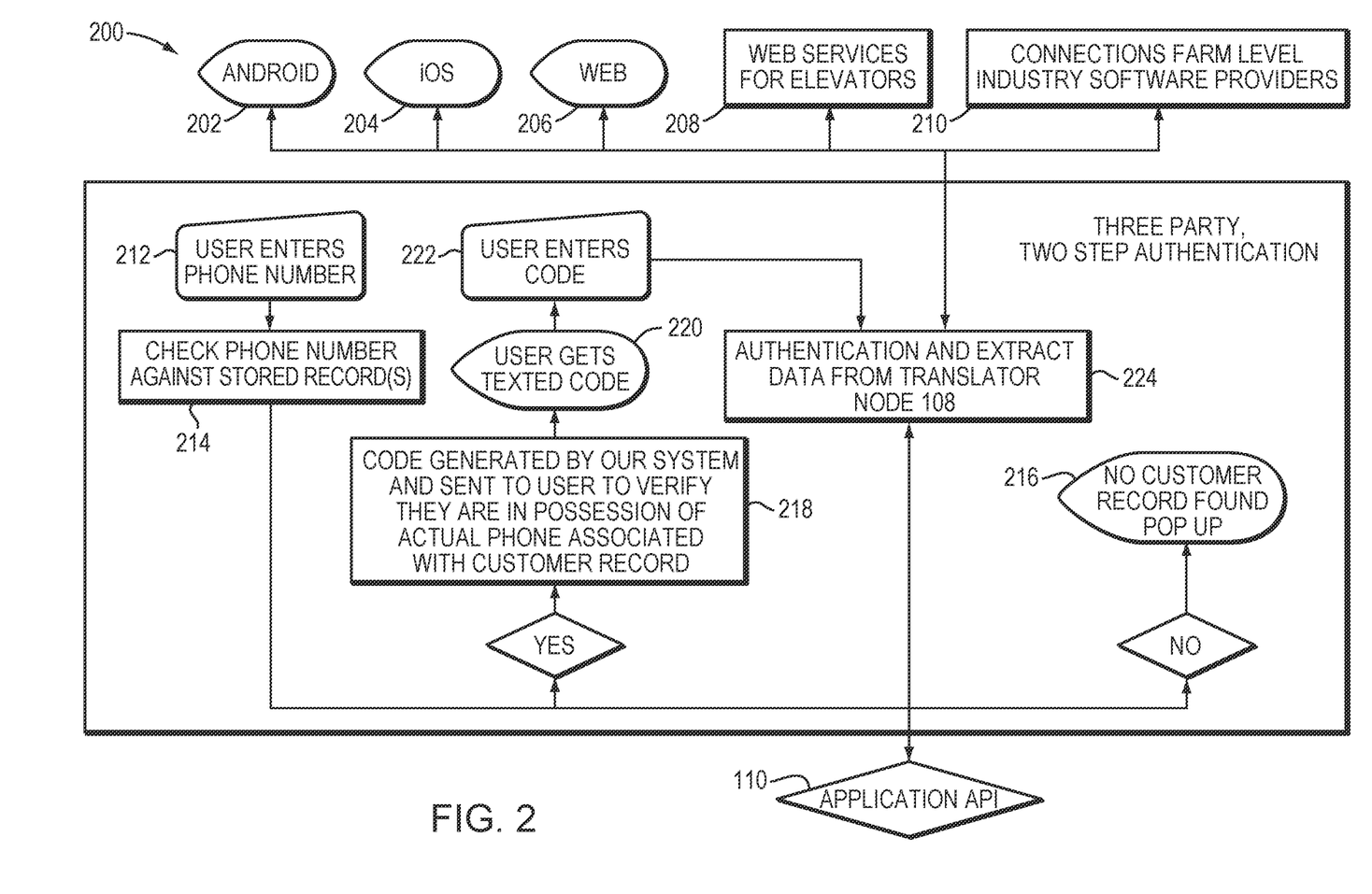
FIG. 2 illustrates an authentication process for using the system of FIG. 1 in accordance with one embodiment.

The system 100 may be configured to set certain access privileges so that only authorized growers or other entities may access the platform 102. For example, FIG. 2 illustrates a flowchart of an authentication process 200 of the API 110 of FIG. 1 in accordance with one embodiment. The API 110 may be written to and operate in conjunction with a variety of types of systems operating on the user device 104 such as Android 202, iOS 204, web browsers 206, etc. These systems may be configured to operate services 208 for elevators (as discussed below), and connect various farm-level industry software providers 210.

The process 200 may start in step 212 in which a user (such as a grower) enters a phone number or some other credential. The user may enter this information via a user device such as the user device 104 of FIG. 1 that is in communication with the platform 102.

In step 214 the phone number may be checked against customer records stored in the translator node 108 or other database 118, 120, 122. This step ensures that the grower is, for example, registered with the system 100. If the phone number is not registered, a message may be returned that indicates that no customer record is found with that phone number in step 216. On the other hand, if the phone number is recognized, the system 100 may generate a code and send the code to the user to verify they are in possession of the actual phone that is associated with the customer record in step 218.

The system 100 may therefore send the grower 106 a code via text in step 220. The grower may then enter the code in step 222 using the user device. The grower 106 is then authenticated and able to provide and receive all relevant data associated with that grower 106 from the translator node 108 in step 224.

Figure 3:
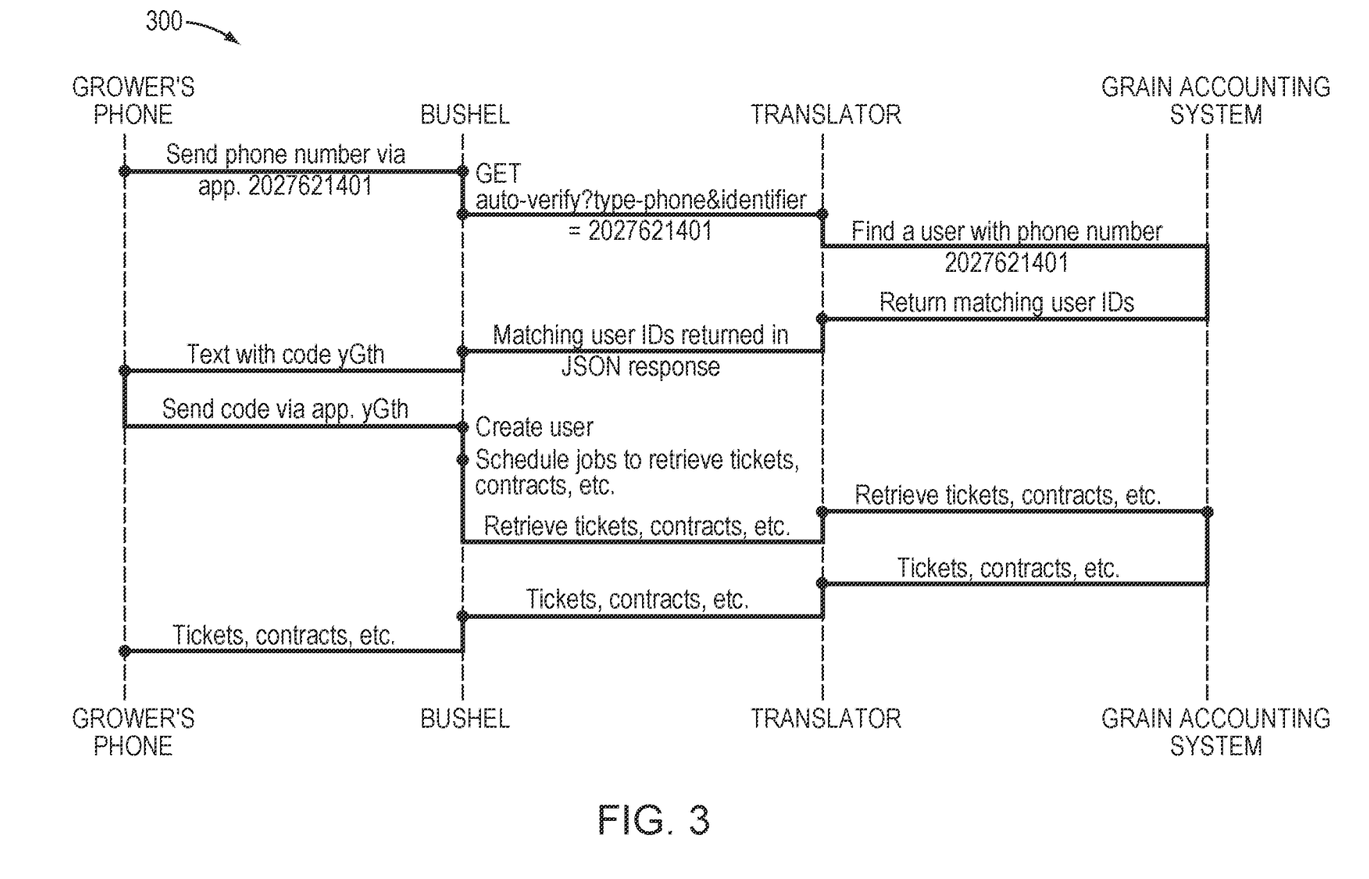
FIG. 3 illustrates an authentication process for using the system of FIG. 1 in accordance with another embodiment.

FIG. 3 illustrates an authentication process 300 for using the system 100 in accordance with another embodiment. The authentication process 300 may include a plurality of steps that occur in order as indicated by the line 302.

First, a grower may provide their phone number via an application executing on a user device 104 (e.g., a smartphone). Their phone number may be communicated to the system 100 as part of a verification step. Specifically, the translator node 108 may then search one or more databases to find a registered user with or otherwise associated with the provided phone number. These databases may include those illustrated in FIG. 1 as part of the system 100, for example.

The system 100 may then return one or more users that are associated with the provided phone number. There may be only one user associated with a phone number (e.g., the owner/user of a particular smartphone), or there may be multiple users associated with a provided phone number. The translator node 108 may match these users to particular user identification labels (i.e., User IDs), and provide the user-User ID pair in a JSON response to the bushel. The bushel may then send a one-time use code (e.g., "yCth") to the provided phone number.

The grower (or some other authorized user) may then send the one-time use code to the system 100. At this point, the system 100 has verified the user exists. This ensures that an authorized user is using the phone associated with the provided phone number. The bushel/translator node 108 may then create or update any required information in the user's record stored in one or more of the databases of FIG. 1.

The user may then use the registered phone to schedule jobs to retrieve tickets, contracts, etc. Specifically, the user may input the desired information or actions via their smartphone, which may be passed along to the bushel, the translator node 108, and to the appropriate components of the system 100. The system 100 may then provide the required information back to the translator node 108, to the bushel, and then back to the user.

As seen in FIG. 1, and as mentioned above, the platform 102 can also be accessed by applications written against the application API 110 to permit the retrieval of standardized data from the platform 102. For example, a branded native mobile application can enable growers to access data collected by commodity elevators. This accessed data may include data regarding the relationships between elevators and growers such as scale tickets and commodity contracts.

Figure 4:
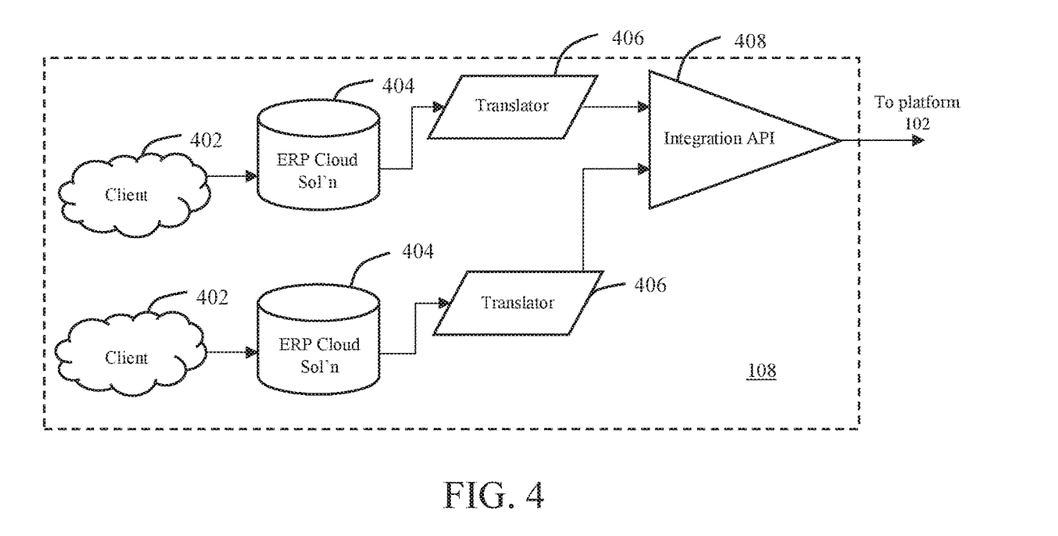
FIG. 4 illustrates the translator node of FIG. 1 in accordance with one embodiment.

FIG. 4 illustrates the translator node 108 of FIG. 1 in accordance with one embodiment. Data from one or more clients 402 (e.g., growers) may be communicated to one or more ERP cloud solutions 404. These ERP cloud solutions 404 may include, but are not limited to, AGVANCE®, AgTrax, ELEVATE®, TRAXVIEW®, or the like.

The ERP cloud solutions 404 may be on-premise servers, but may also exist in a cloud-based network. Data such as manually-entered data and/or data from various interfaces associated with a client 402 may be provided from the client 402 to the ERP cloud solutions 404.

At this point, the data is not standardized and may exist in a number of forms. This data may be referred to as "unstandardized data" as the type and format of the data may vary across multiple ERP cloud solutions 404.

The ERPs 404 may communicate this unstandardized data regarding the clients 402 and their operations to translator services 406. The translator service(s) 406 may be installed at various locations such as, but not limited to, locally at an elevator, in a hosted configuration, at a data center, or the like.

The translator services 406 may standardize the data received from the ERPs 404. In other words, the translator services 306 may convert the unstandardized data to a standardized form.

For example, dates provided by the multiple ERP cloud solutions 404 may be provided in multiple forms, and the translator services 406 convert them into a standardized date form. In some cases, the translator services 406 may enable up to, but not limited to, tens of thousands of simultaneous connections by growers across several ERPs 404.

Standardizing data provides a number of advantages. For one, it ensures that data from multiple ERP cloud solutions 404 is consistent. Second, third parties such as insurance companies are not required to spend time and resources in translating/standardizing data themselves.

Standardizing data also improves the deliverability of data in areas in which network connectivity or accessibility is low. These areas may include farm fields, for example, or other areas that do not have reliable access to the internet. By standardizing data, however, the systems and methods described herein are able to deliver smaller packets of data out to the user devices 104, thereby providing the users with a more enjoyable experience.

Another advantage of standardizing the received data is that it enables the systems and methods described herein to be extended into other parts of the supply chain. For example, insurance companies are required by federal law to collect proof of yields or whole farm production data. One of the approved ways insurance companies can do this is through a scale ticket. Presently, an insurance company or farmer has to deliver paper tickets for an adjuster or a farmer would have to proceed elevator-by-elevator to obtain individual reports, and then deliver them to the adjuster.

However, because the systems and methods described herein standardize the received data, a grower can more easily provide all data from his elevators to an insurance company at once. That is, the involved parties are not required to make on-site visits to each elevator.

Although the advantages above are discussed in the context of providing benefits to insurance companies for inspection purposes, other parties may similarly benefit. For example, partner companies or individuals that work with a particular grower may benefit from the standardized data provided by the systems and methods described herein.

A proprietary integration API 408 may then integrate any received data, and securely transfer the processed data to the platform 102 of FIG. 1. Once transferred to the platform 102, this data is made available to the other nodes and may be used to accomplish the features of various embodiments described herein.

Figure 5:
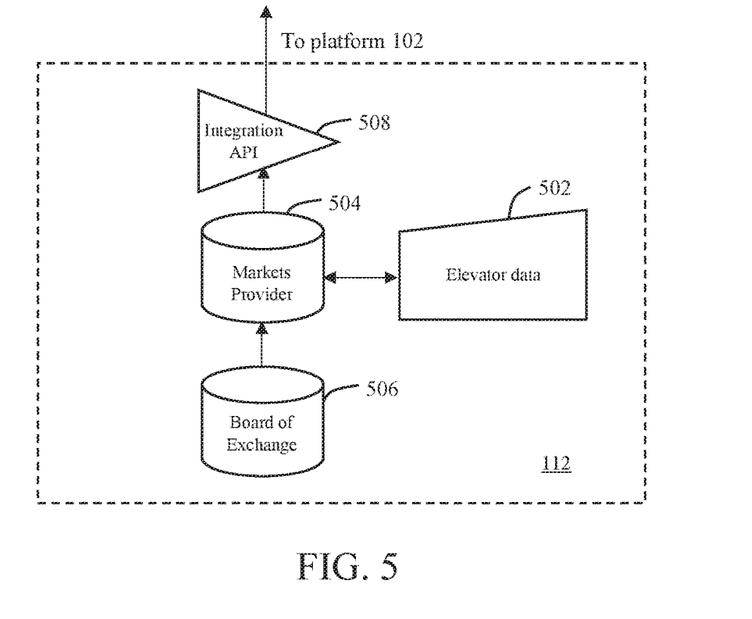
FIG. 5 illustrates the commodity market node of FIG. 1 in accordance with one embodiment.

FIG. 5 illustrates the commodity market node 112 of FIG. 1 in accordance with one embodiment. In operation, elevator data 502 regarding, for example, offers to purchase grain or other commodities may be communicated to a markets provider database 504. Growers may enter this data using, for example, a web portal executing on any suitable user device 104.

The markets provider database 504 may be in communication with a board of exchange data source 506 that provides additional information related to market conditions. This data may include futures prices, basis prices, cash bids, or the like. The received data regarding market conditions may be integrated by an integration API 508 before being transmitted to the platform 102.

The system 100 may automatically combine the data from the translator node 108 (i.e., from the translator services 406) regarding a particular grower and the market data from the commodity market node 112. This market data may relate to offer prices set by the grower and/or relate to contracts such as "price later" contracts (also known as "delayed pricing" or "no price established contracts"), open storage contracts, or contracts that have open terms. Data regarding other types of contracts may be stored and analyzed as well.

This combined data may be provided to the grower 106 in real time. Accordingly, the grower 106 may understand their financial positions with respect to business conducted at an elevator or some other location. For example, a grower can leverage this data to price his open storage corn that exists at an elevator by multiplying an offer created by the elevator for a certain futures market.

Additionally, with reference back to FIG. 1, a grower 106 may set up alerts via a user device 104 to receive email, SMS, IM, etc. when various conditions are met. These conditions may relate to price, volume, certain market conditions, or the like.

For example, any suitable processing device can assign a financial value to a grower's commodity based on the characteristics of the commodity and market conditions. Upon the assigned financial value satisfying one or more predetermined conditions, an alert may be sent to the grower. The grower may then be inclined to enter into a contract, for example.

Figure 6:
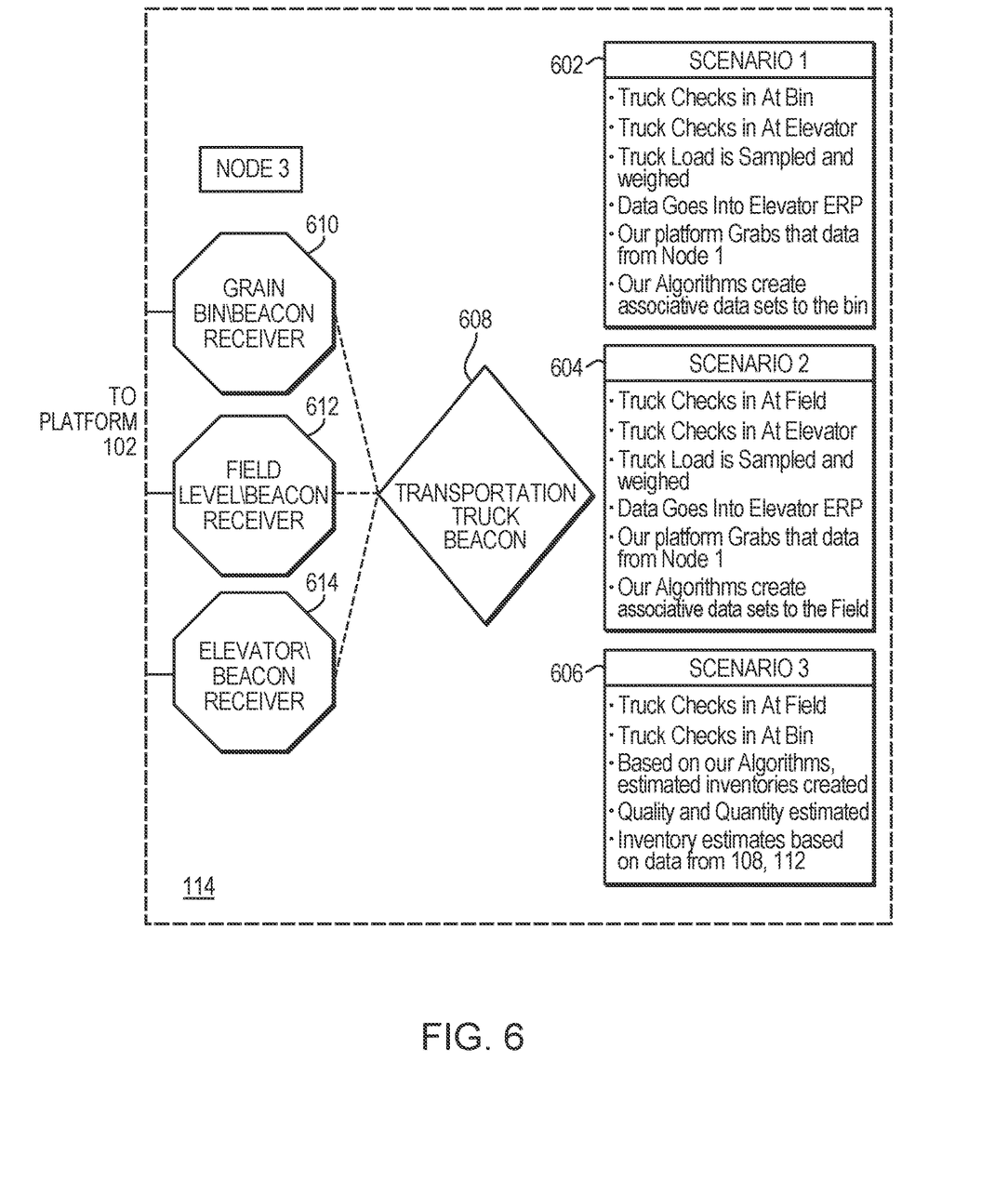
FIG. 6 illustrates the delivery node of FIG. 1 in accordance with one embodiment.

FIG. 6 illustrates the delivery node 114 in accordance with one embodiment. The delivery node 114 may allow a grower to collect and review data relating to a delivered commodity and/or the status of commodity deliveries. FIG. 6 outlines three scenarios 602, 604, and 606 that specify exemplary delivery workflows and data that may be considered.

For example, in a first scenario 602 a transportation vehicle such as a truck may check in at a bin at a facility. The truck may then check in at a particular elevator. Once at the elevator, the commodity may be sampled, weighed, and loaded onto the truck. Data regarding the particular sample may then be communicated to that particular elevator's ERP and then passed along to the platform 102.

In a second scenario 604, a transportation vehicle such as a truck may check in at a field. Then, the truck may check in at a particular elevator. Once at the elevator, the commodity may be sampled, weighed, and loaded onto the truck. Data regarding the particular sample may then be communicated to the elevator's ERP, and then passed along to the platform 102.

In a third scenario 606, a transportation vehicle such as a truck may check in at a field and/or a bin. The platform 102 may then provide estimates of inventory (e.g., quality and quantity) at a truck, at an elevator, out for delivery etc. This estimation may also be based on data from other nodes of the system 100 such as the translator node 108 and the commodity market node 112.

More generally, the delivery node 114 may collect the average truck weight for each delivery. The truck's delivery weight may be a function of the commodity and/or the commodity's moisture level. When a truck checks into a bin, therefore, the platform 102 may determine the number of delivered bushels (or other measurable quantity of the commodity) along with estimated quality measurements.

To accomplish these features, the delivery node 114 may rely on an IBEACON or other type of tracking device 608 configured with the transportation vehicle. The delivery node 114 may further rely on tracking devices such as bin receivers 610, field receivers 612, and/or elevator receivers 614.

Once at the elevator (or some other location), as discussed above, the elevator may obtain the sample of the truck's commodity and gather one or more measurements. Measurements associated with the commodity may include protein content, for example. These measurements may be entered into the elevator's ERP 404 and/or a separate system such as a government-mandated program.

As discussed previously, this measurement data is processed by a platform-appropriate translator and entered into the platform 102. As the vehicle visits the elevator, the system 100 may therefore collect data associated with the vehicle and the vehicle's visit, and register it against the other data collected from that particular transportation vehicle (such as commodity sample data and weight).

During subsequent visits to a particular storage facility (e.g., to a grain bin or storage shed), the systems and methods described herein may register the vehicle's presence and, depending on context, may perform various actions. For example, the system 100 may apply an algorithm to the data collected by the elevator such as, but not limited to, the average weight of the sampled commodity from the vehicle to estimate the weight of the commodity that entered the facility. Or, the system 100 may register that a commodity was taken from a particular facility such as from an individual grain bin. Upon the commodity being sampled at the elevator, the data may be processed by the translator services 406 of FIG. 4 and used to update the records of the expected commodity quality and quantity in the facility.

The systems and methods in accordance with various embodiments may process the data received from the translator services 306 originating with a cloud or locally-hosted ERP system, the commodity data, and the delivery data. The system 100 is therefore able to provide real time information to the grower concerning the value of their entire commodity supply. This data may relate to offer prices hosted by various elevators and discounts applied to the commodity deriving from, for example, the sampled commodity such as test weight, moisture, or protein. In addition to inventory value, growers can also compare this data to previously-completed contracts to create blend of a real time revenue position for a selected period of time.

The combination of the wireless commodity origination recognition system and translators allows for the creation of referential integrity to sampled loads by third parties. An example would be the Soybean check-off program which involves sampling soybean loads for protein or oil content, adding the gathered data to the cloud platform 102, and then generating reports including the soybeans' origin for use in research.

The data loaded into the platform 102 from nodes 108, 112, and/or 114 may be made available through API's to therefore enable the suppliers of the growers to view the gathered data. Additionally, this data may be available to other parties such as commodity insurance companies. For example, a farmer or grower can use a branded application that interacts with the cloud platform 102 through an API 110 to authenticate data that has been loaded into the platform 102 prior to further use and analysis.

Referring back to FIG. 1, the content management system (CMS) 116 may help manage data such as users, various metrics, dashboards, data exportation, or the like. To accomplish this, the CMS 116 may rely on a database 118 storing information regarding entities such as growers and their commodities, a push server 120 for pushing resources to clients when desirable, and a database of, e.g., contact information 122 such as the email addresses of various entities.

Figure 7:
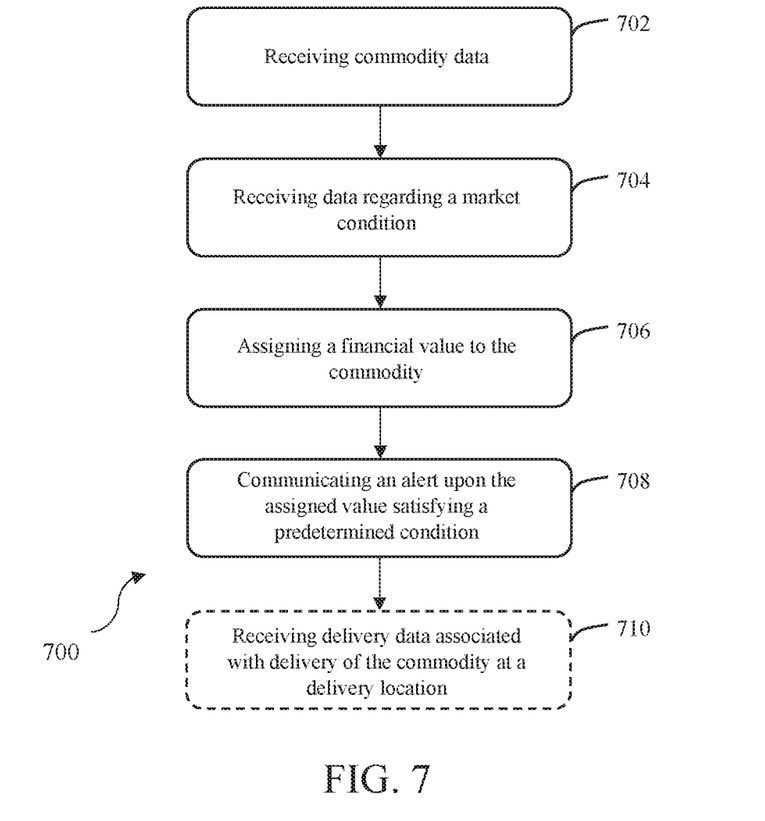
FIG. 7 depicts a flowchart of a method for tracking a commodity in accordance with one embodiment.

FIG. 7 depicts a flowchart of a method 700 for tracking a commodity in accordance with one embodiment. Step 702 involves receiving commodity data using a translator service from at least one enterprise resource planning system. The translator service and the enterprise resource planning system may be similar to the translator services 406 and the ERPs 404 of FIG. 4, respectively.

The received commodity data may relate to various aspects of an entity's operations. The commodity data may include at least one of a quantity of an entity's commodity, a location of the commodity, at least one characteristic of the commodity, movement of the commodity, and transactions involving the commodity. This list is merely exemplary, and other types of commodity data in addition to or in lieu of the above may be considered as well.

Step 704 involves receiving data regarding a market condition relating to the commodity using the translator service. This data may be received from a source such as the commodity market node 112 of FIGS. 1 and 4, for example. As mentioned previously this data may include, but is not limited to, at least one of prices, volume, discount criteria, offers, or the like.

Step 706 involves assigning, using a processor executing instructions stored on a memory, a financial value to the entity's commodity based on the data regarding the market condition and the commodity data. Accordingly, this value may provide an entity such as a grower with a real time view of his financial position with respect to his commodities based on the commodity data and the market conditions related to the commodity.

Step 708 involves communicating an alert using an interface to the entity upon the assigned financial value satisfying a predetermined condition. As mentioned previously, a grower may want to know when certain conditions are satisfied with respect to their commodities. This interface may be executing on a user device such as the user device 104 of FIG. 1. The alert may be a visual alert, an audio alert, a haptic-based alert, or some combination thereof.

Step 710 is optional and involves receiving, using the translator service, delivery data associated with delivery of the commodity at a delivery location. As discussed previously, a grower may monitor the transportation of their commodity to, for example, ensure the commodity is delivered, delivered at a certain time, at a certain location, etc.

A grower may therefore configure their transportation vehicles with tracking devices such as IBEACONS to monitor the transportation and delivery of the commodity of interest. Similarly, growers may receive data from elevators or other delivery locations related to the delivery of their commodity. The delivery location may be at an elevator, a storage location, a customer location, or the like. Although this step is illustrated in FIG. 7 as the final step of method 700, this step may occur at other times before, after, or contemporaneously as other steps of the method 700.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Having been provided with the description and illustration of the present application, one skilled in the art may envision variations, modifications, and alternate embodiments falling within the general inventive concept discussed in this application that do not depart from the scope of the following claims.

What is claimed is:

1. A method for tracking a commodity, the method comprising:
   receiving commodity data using a translator service from at least one enterprise resource planning system, wherein the commodity data includes at least one of a quantity of an entity's commodity, a location of the commodity, movement of the commodity, and a transaction involving the commodity;
   standardizing the commodity data using the translator service;
   receiving data regarding a market condition relating to the commodity using the translator service;
   automatically assigning, using a processor executing instructions stored on a memory, a financial value to the commodity based on the data regarding the market condition and the commodity data;
   verifying an identity of a user by:
      receiving, with the translator service, a phone number of the user;
      searching, with the translator service, at least one database for the phone number of the user;
      receiving, at the translator service, a list of entities associated with the phone number, the list of entities comprising the user;
      matching, with the translator service, each entity in the list of entities with a user identification label;
      communicating the user identification label associated with the user in a JSON response from the translator service;
      receiving a one-time use code from the user to verify the identity of the user; and
   communicating an alert to the user using a user interface upon the assigned financial value satisfying a predetermined condition.

2. The method of claim 1 wherein the predetermined condition includes at least one of price, volume, and discount criteria.

3. The method of claim 1 further comprising receiving, using the translator service, delivery data associated with delivery of the commodity at a delivery location.

4. The method of claim 1, wherein the commodity data is from at least two enterprise resource planning systems.

5. The method of claim 1 wherein the data regarding the location of the commodity or the movement of the commodity is received from a beacon device configured with at least one commodity transportation vehicle.

6. The method of claim 1 further comprising communicating the commodity data from the translator service to a cloud service platform.

7. The method of claim 6 wherein the platform is accessible by an application programming interface to permit retrieval of standardized data from the platform.

8. The method of claim 1 wherein the commodity is grain.

9. The method of claim 1 wherein the at least one characteristic of the commodity includes at least one of protein content and moisture content.

10. A system for tracking a commodity, the system comprising:
- a translator service for receiving commodity data and data regarding a market condition relating to the commodity and standardizing the received commodity data, wherein the commodity data includes at least one of a quantity of an entity's commodity, a location of the commodity, movement of the commodity, and a transaction involving the commodity;
- a processor executing instructions stored on a memory for:
  - standardizing the commodity data using the translator service;
  - receiving data regarding a market condition relating to the commodity using the translator service;
  - automatically assigning a financial value to the commodity based on the data regarding the market condition and the commodity data;
  - verifying, with the translator service, an identity of a user by:
    - receiving, with the translator service, a phone number of the user;
    - searching, with the translator service, at least one database for the phone number of the user;
    - receiving, at the translator service, a list of entities associated with the phone number, the list of entities comprising the user;
    - matching, with the translator service, each entity in the list of entities with a user identification label;
    - communicating the user identification label associated with the user in a JSON response from the translator service;
    - receiving a one-time use code from the user to verify the identity of the user; and
  - communicating an alert to the user using a user interface upon the assigned value satisfying a predetermined condition.

11. The system of claim 10 wherein the predetermined condition includes at least one of price, volume, and discount criteria.

12. The system of claim 10 wherein the translator service is further configured to receive delivery data associated with delivery of the commodity at a delivery location.

13. The system of claim 10, wherein the commodity data is from at least two enterprise resource planning systems.

14. The system of claim 10 wherein the data regarding the location of the commodity or the movement of the commodity is received from a beacon device configured with at least one commodity transportation vehicle.

15. The system of claim 10 further comprising a cloud service platform configured to receive the commodity data from the translator service.

16. The system of claim 15 wherein the platform is accessible by an application programming interface to permit retrieval of standardized data from the platform.

17. The system of claim 10 wherein the commodity is grain.

18. The system of claim 10 wherein at least one characteristic of the commodity includes at least one of protein content and moisture content.

19. A non-transitory computer readable medium containing computer-executable instructions for performing a method for tracking a commodity, the medium comprising:
- computer-executable instructions for receiving and standardizing commodity data using a translator service from at least one enterprise resource planning system, wherein the commodity data includes at least one of a quantity of an entity's commodity, a location of the commodity, movement of the commodity, and a transaction involving the commodity;
- computer-executable instructions for receiving data regarding a market condition relating to the commodity using the translator service;
- computer-executable instructions for automatically assigning, using a processor executing instructions stored on a memory, a financial value to the commodity based on the data regarding the market condition and the commodity data;
- computer-executable instructions for verifying an identity of a user, using a processor executing instructions on a stored memory, by verifying an identity of a user by:
  - receiving, with the translator service, a phone number of the user;
  - searching, with the translator service, at least one database for the phone number of the user;
  - receiving, at the translator service, a list of entities associated with the phone number, the list of entities comprising the user;
  - matching, with the translator service, each entity in the list of entities with a user identification label;
  - communicating the user identification label associated with the user in a JSON response from the translator service; and
  - receiving a one-time use code from the user to verify the identity of the user; and
- computer-executable instructions for communicating an alert using a user interface to the entity upon the assigned financial value satisfying a predetermined condition.

* * * * *